3,636,210
CHOLANIC ACID AND CHOLENIC ACID COMPOSITIONS AND METHOD OF TREATMENT
Eugene E. Howe, Somerset, and Jesse W. Huff, Westfield, N.J., assignors to Merck & Co., Inc., Rahway, N.J.
No Drawing. Filed Feb. 2, 1968, Ser. No. 702,510
Int. Cl. A61k 27/00
U.S. Cl. 424—238         18 Claims

ABSTRACT OF THE DISCLOSURE

Pharmaceutical compositions containing (1) a cholanic acid, (2) a nuclear unsaturated cholenic acid or (3) a nuclear hydroxy substituted cholanic acid as the active ingredient. The compositions reduce plasma cholesterol and triglyceride levels in blood serum and, therefore, are useful in the treatment of conditions associated with atherosclerosis.

---

This invention relates to novel pharmaceutical compositions which are useful as hypolipemics and hypocholesterolemics and to methods of using same.

There is no clear agreement about the actual role of plasma lipids in the localization of atherosclerotic plaques but numerous studies support the concept that lipids play a major role in the pathogenesis of atherosclerosis because along with fibrin they accumulate in the arterial intima and subintima and product arterial corrosion.

Cholesterol and triilycerides are typical of the many lipids which are present to some extent in all ordinary diets. Such lipids are known to be synthesized in the body from intermediates of metabolic origin and, therefore, it has long been desired to develop a chemotherapeutic composition which would effect a reduction in cholesterol and triglyceride levels. It has now been found in tests on mice that the instant compositions exhibit surprisingly good inhibitory effects on the formation of cholesterol in blood serum without inducing significant weight loss or any other of the contraindications sometimes associated with hypolipemic and hypocholesterolemic activity. Also, in tests on rats and dogs the instant compositions effect a strikingly good triglyceride-lowering response. Groups of male rats fed on diet containing 0.0081% and 0.025% by weight of the instant ingredients show a reduction in plasma triglyceride levels which is several times greater than that which can be obtained with other closely analogous compounds. This ability to effectively reduce triglyceride and cholesterol levels in serum bespeaks their usefulness as hypolipemic and hypocholesterolemic agents and augurs well for their application in the treatment of conditions associated with atherosclerosis.

The compositions of this invention contain as the active ingredient a cholanic acid or nuclear unsaturated cholenic acid having the following general formula:

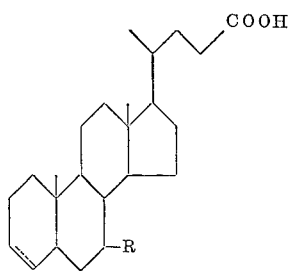

wherein R represents hydrogen or hydroxy and wherein the dotted line in the 3-position indicates that the carbocyclic nucleus may or may not contain an unsaturated double bond within the ring and indicates further that the point of nuclear unsaturation is not limited to the 3-position but includes as well all other isomeric derivatives as, for example, the $\Delta^3$, $\Delta^6$, $\Delta^7$, $\Delta^{9(11)}$ and $\Delta^{11}$ isomers, with the proviso that when R represents hydroxy the carbocyclic nucleus is a saturated cholane ring; and the nontoxic phamacologically acceptable salts of the said acids as, for example, the alkali metal and alkaline earth metal salts such as the sodium, potassium or calcium salts, etc. The foregoing ingredients effectively reduce the concentration of cholesterol and triglycerides in blood serum in animals as, for example, in mice, rats and dogs and can be suitably admixed with any nontoxic pharmaceutically acceptable carrier or inert diluent to obtain the desired composition. Typical of the products (I) embraced by this invention are, for example, 5$\beta$-cholanic acid, 5$\alpha$-cholanic acid, $\Delta^3$-5$\beta$-cholenic acid, $\Delta^6$-5$\beta$-cholenic acid, $\Delta^7$-5$\beta$-cholenic acid, $\Delta^{9(11)}$-5$\beta$-cholenic acid, $\Delta^{11}$-5$\beta$-cholenic acid, 7$\alpha$-hydroxy-5$\beta$-cholanic acid and the alkali metal and alkaline earth salts thereof.

The cholanic acid and cholenic acid products (I) comprising the instant compositions include both the 5$\alpha$ and 5$\beta$ isomers; however, a preferred embodiment of this invention relates to compositions which contain 5$\beta$-cholanic acid, 5$\alpha$-cholanic acid, $\Delta^3$-5$\beta$-cholenic acid, $\Delta^6$-5$\beta$-cholenic acid and $\Delta^7$-5$\beta$-cholenic acid and the alkali metal salts thereof as the active ingredient. In this connection the 5$\beta$-cholanic acid, $\Delta^3$-5$\beta$-cholenic acid and $\Delta^6$-5$\beta$-cholenic acid products have proved to be particularly useful because they effect a significant reduction in the concentration of cholesterol and triglycerides in animals. Thus, for example, in tests on mice 5$\beta$-cholanic acid effects a marked reduction in the concentration of cholesterol without inducing any appreciable weight loss in the subject animal, whereas 5$\alpha$-cholanic acid, $\Delta^3$-5$\beta$-cholenic acid, $\Delta^6$-5$\beta$-cholenic acid and $\Delta^7$-5$\beta$-chloenic acid exhibit a striking reduction in the triglyceride levels of rats and dogs, again without any appreciable weight loss in the host animal. As those skilled in the art will appreciate a reduction in the weight of the animal tested is usually an indication of toxicity; however, the ingredients of this invention not only inhibit and reduce the concentration of cholesterol and triglycerides in serum but do so without any of the untoward side effects usually associated with toxicity.

The active ingredients (I) of this invention may be employed in any one of a variety of compositions as, for example, in capsules, tablets, powders or liquid solutions or as suspensions or elixirs and may be administered orally, intravenously or intramuscularly. Suitable carriers which may be used in the compositions include, for example, mannitol, sucrose, glucose or sterile liquids such as water, saline, glycols and oils of a petroleum, animal, vegetable or synthetic origin as, for example, peanut oil, mineral oil and sesame oil. Also, in addition to a carrier, the instant compositions may also include other ingredients such as stabilizers, binders, anti-oxidants, preservatives, lubricators, suspending agents, viscosity aids, flavoring agents and the like.

There may also be included in the composition other active ingredients to provide a broad spectrum of activity. Thus, for example, in the treatment of hypercholesterolemia, a commonly encountered complication is the occurrence of edema and/or obesity which may be treated by including within the hypercholesterolemic composition an appropriate diuretic and/or anorectic. The type and amount of such additional ingredients to be included within the composition will depend largely upon the malady to be treated and, therefore, these features can be easily determined by those skilled in the art.

The dosage to be administered depends to a large extent upon the condition being treated and the weight of the subject. In general, however, a daily dosage consists of from about 0.5 to about 500 mg. of active ingredient per kilogram of body weight of the subject to be treated in one or more applications per day. A preferred daily dosage lies in the range of from about 5 to 15 mg. of active ingredients per kilogram of body weight.

The instant compositions may be administered in several unit dosage forms as, for example, in solid or liquid orally ingestible dosage forms, in which case the active ingredient is admixed with an orally ingestible pharmaceutically acceptable solid or liquid such as mannitol, sorbitol, sucrose, calcium phosphate or potable water or a vegetable oil such as peanut oil or with sesame oil, corn oil or with alcohol and the like. The compositions, per unit dosage, whether liquid or solid, will generally contain from about 10 mg. to about 500 mg. by weight of the active drug based on the total weight of the composition and depending upon the type of formulation desired. However, a range of from about 35–350 mg. is preferably employed. In addition, the compositions may also include other ingredients such as stabilizers, binders, anti-oxidants, preservatives, lubricators, suspending agents, viscosity aids, flavoring agents and the like.

Another suitable formulation is a chewable tablet in which the cholanic acid or cholenic acid (I) is present to the extent of from about 10 mg. to about 500 mg. by weight and preferably from 35–350 mg. by weight in a pharmaceutically aceptable orally ingestible solid carrier together with a gum base. Again, if desired, the composition may also contain flavors, binders, lubricants and other excipients known in the art. Tablets suitable for chewing should weigh, in general, from 250 mg.–2.0 grams and should contain approximately 35–350 mg. of active ingredinet. Tablets desired for swallowing rather than chewing may be prepared by employing proportionately smaller amounts of ingredients.

Another route for oral administration is in the form of a soft gelatin capsule. Such compositions may contain from 35–350 mg. by weight of active ingredient dissolved or suspended in a pharmaceutically acceptable oil such as those mentioned above or in alcohol, glycerine, water or the like.

Alternatively, a hard gelatin capsule formulation may be prepared by admixing 35–350 mg. of active ingredient with pharmaecutically acceptable ingredients. Thus, by mixing 100 mg. of a cholanic acid or cholenic acid (I) or a suitable salt thereof, with 144 mg. of lactose and 6 mg. of magnesium stearate and placing the 250 mg. mixture into a No. 3 gelatin capsule, a suitable unit dosage capsule may be obtained. Similarly, by employing more of the active ingredient and less lactose other dosage forms can be put up in No. 3 gelatin capsules and should it be necessary to mix more than 250 mg. of ingredient together, larger capsules may be employed.

The active ingredient may also be formulated as a liquid solution or suspension or as a dry powder, the latter to be used in drinking water, fruit juice, vegetable juice and the like. For orally administerable liquids, aqueous solutions of the active ingredient in the form of its salt is preferred at concentrations of from about 1–5% (w./v.). Also, preservatives, flavoring agents and the like may be added and, if desired, alcohol may be added to provide elixir type formulations.

With regard to the prepartion of dry powders containing the active ingredient in a water-insoluble form, the composition should contain a minor amount of a suspending agent to aid in the suspension of the material. Also, if desired, a flavoring agent such as a sugar and a preservative may be employed.

The following examples illustrate the preparation of representative dosage forms containing a cholanic acid, cholenic acid product (I) or the salts thereof as active ingredient. However, the examples are illustrative only and those skilled in the art will appreciate that in practice the dose to be administered will depend upon the disease to be treated, upon the age, health and weight of the patient, upon the extent of cholesterol and triglyceride concentration in the subject, upon the frequency of treatment and upon the nature of concurrent treatment if any.

EXAMPLE 1

Dry-filled capsule

A dry-filled capsule is prepared from the following ingredients:

| | Per capsule, mg. |
|---|---|
| $5\beta$-cholanic acid | 100 |
| Lactose | 144 |
| Magnesium stearate | 6 |
| Capsule size No. 3 | 250 |

The $5\beta$-cholanic acid is reduced to a No. 60 powder and lactose and magnesium stearate are then passed through a No. 60 bolting cloth onto the powder and the combined ingredients admixed for ten minutes and filled into a No. 3 gelatin capsule.

EXAMPLE 2

Chewable tablet

A chewable tablet is prepared from the following ingredients:

| | Mg. |
|---|---|
| $5\alpha$-cholanic acid | 100 |
| Mannitol | 865 |
| Sucrose | 500 |
| Gum acacia | 25 |
| Magnesium stearate (flavors, as needed) | 10 |
| | 1500 |

The $5\alpha$-cholanic acid, manitol, sucrose and gum acacia are mixed and passed through a No. 60 bolting cloth. The magnesium stearate is added to the bolted material and the mixture is slugged to form granules. The granules are passed through a No. 12 sieve and then through a No. 18 sieve and the fines reslugged to form granules of the desired size. The granules are then compressed into tablets.

EXAMPLE 3

Compressed tablet

A tablet suitable for swallowing is prepared from the following ingredients:

| | Mg. |
|---|---|
| $\Delta^3$-$5\beta$-cholenic acid | 100 |
| Maize starch | 30 |
| Alginic acid | 15 |
| Magnesium stearate | 5 |
| | 150 |

A mixture of the $\Delta^3$-$5\beta$-cholenic acid, maize starch, alginic acid and magnesium stearate (2.5 mg.) is compressed into slugs which are then broken into granules. The granules are sifted through an 8 mesh screen and additional magnesium stearate (2.5 mg.) is added. The mixture is then compressed into tablets suitable for oral administration.

EXAMPLE 4

Gelatin Capsule

A soft elastic gelatin capsule is prepared from the following ingredients:

| | Mg. |
|---|---|
| $\Delta^6$-$5\beta$-cholenic acid | 100 |
| Wheat germ oil | 50 |
| Sunflower seed oil | 100 |
| | 250 |

The $\Delta^6$-$5\beta$-cholenic acid and wheat germ oil are dissolved in sunflower seed oil. The solution then is poured into gelatin capsules which are suitable for oral administration.

The wheat germ oil and sunflower seed oil may be replaced by an equal amount of peanut oil or dimethylacetamide to obtain like capsules which are also suitable for oral administration.

EXAMPLE 5

Suspension for oral use

A suitable suspension for oral use is prepared from the following ingredients:

| | |
|---|---|
| $\Delta^7$-5$\beta$-cholenic acid | 100 mg. |
| Gum acacia | 5 mg. |
| Sorbic acid | 10 mg. |
| Tragacanth | 1 mg. |
| Sorbitol solution (U.S.P.) 70% | 2 ml. |
| Purified water U.S.P. (flavors, as desired) | ¹ q.s. |
| | 5 ml. |

¹ I.e., a sufficient quantity.

A mixture of the $\Delta^7$-5$\beta$-cholenic acid and gum acacia is added to the tragacanth. To the thoroughly triturated mixture is added slowly with stirring a solution of the sorbic acid and sorbitol solution in water. Following the incorporation of a suitable flavoring agent, if desired, the mixture is homogenized by passage through a conventional homogenizer and there is thus obtained a suspension suitable for oral administration.

EXAMPLE 6

Compressed tablet

A compressed tablet suitable for swallowing is prepared from the following ingredients:

| | Mg. |
|---|---|
| 7$\alpha$-hydroxy-5$\beta$-cholanic acid | 50 |
| Lactose U.S.P. No. 80 powder | 130 |
| Starch (12½% paste) | 6 |
| Corn starch | 3 |
| Magnesium stearate | 1 |
| | 190 |

The 7$\alpha$-hydroxy-5$\beta$-cholanic acid and lactose are mixed thoroughly and then granulated with the starch paste. The granulation is passed through a No. 14 screen while still moist and then dried at 45° C. in an oven. After thorough drying the material is passed several times through a No. 14 screen and the corn starch is passed through a No. 90 bolting cloth onto the granulation and blended, whereafter the magnesium stearate is passed through a No. 60 bolting cloth onto the granulation and thoroughly blended therewith. The material then is compressed into tablets each weighing 190 mg.

EXAMPLE 7

Water-insoluble dry powder

A water-insoluble dry powder dosage form is prepared by blending the following ingredients:

| | Percent by weight |
|---|---|
| 7$\alpha$-hydroxy-5$\beta$-cholanic acid | 25–90 |
| Suspending agent | q.s. |
| Flavoring agent | 10–60 |
| Preservative | q.s. |

EXAMPLE 8

Water-soluble dry powder

Dry powders containing a water-soluble form of the active ingredient may contain up to about 60% by weight of flavoring agent such as sorbitol, mannitol, sucrose and the like and, also, a preservative. The following composition illustrates the preparation of a representative dosage form; the dry powders are thoroughly blended to obtain a water-soluble dry powder formulation:

| | Percent by weight |
|---|---|
| 5$\beta$-cholanic acid | 25–90 |
| Flavoring agent | 10–60 |
| Preservative | 0–1.0 |

It will be apparent from the foregoing that the instant invention constitutes a valuable contribution to the search for an effective hypocholesterolemic and it should also be understood that the compositions described in the above examples are merely illustrative and are capable of wide variation and modification without departing from the spirit of this invention.

What is claimed is:

1. A pharmaceutical composition useful in the treatment of hypercholesterolemia and hyperlipemia comprising as the active ingredient from 0.5–500 mg. of a compound having the formula:

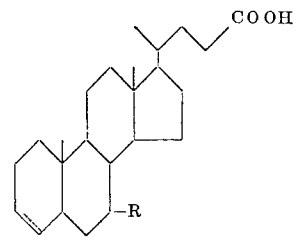

wherein R represents hydrogen or hydroxy and wherein the dotted line in the 3-position indicates that the carbocyclic nucleus may or may not contain an unsaturated double bond within the ring and indicates further that the point of nuclear unsaturation is not limited to the 3-position but includes as well the $\Delta^6$, $\Delta^7$, $\Delta^{9(11)}$ and $\Delta^{11}$ isomeric derivatives, with the proviso that when R represents hydroxy the carbocyclic nucleus is a saturated cholane ring, and the nontoxic pharmacologically acceptable salts of the said acids with a nontoxic pharmaceutically acceptable carrier.

2. A composition according to claim 1 wherein the active ingredient is 5$\beta$-cholanic acid, 5$\alpha$-cholanic acid, $\Delta^3$-5$\beta$-cholenic acid, $\Delta^6$-5$\beta$-cholenic acid or $\Delta^7$-5$\beta$-cholenic acid.

3. A composition according to claim 1 wherein the active ingredient is 5$\beta$-cholanic acid, $\Delta^3$-5$\beta$-cholenic acid of $\Delta^6$-5$\beta$-cholenic acid.

4. A composition according to claim 1 wherein the active ingredient is present in the amount of from 5–15 mg.

5. A composition according to claim 1 wherein the active ingredient is 5$\beta$-cholanic acid.

6. A composition according to claim 1 comprising 5$\beta$-cholanic acid in sterile water.

7. A composition according to claim 1 wherein the active ingredient is $\Delta^3$-5-$\beta$-cholenic acid.

8. A composition according to claim 1 wherein the active ingredient is $\Delta^6$-5$\beta$-cholenic acid.

9. A composition according to claim 1 in tablet form comprising 5$\beta$-cholanic acid as the active ingredient.

10. A composition according to claim 1 in capsule form comprising 5$\beta$-cholanic acid as the active ingredient.

11. A method for the treatment of hypercholesterolemia and hyperlipemia in an animal which comprises administering an effective amount of from 0.5–500 mg. of a pharmaceutical composition comprising a compound having the formula:

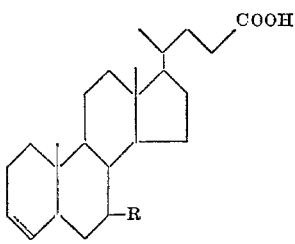

wherein R represents hydrogen or hydroxy and wherein the dotted line in the 3-position indicates that the carbocyclic nucleus may or may not contain an unsaturated double bond within the ring and indicates further that the point of nuclear unsaturation is not limited to the 3-position but includes as well the $\Delta^6$, $\Delta^7$, $\Delta^{9(11)}$ and $\Delta^{11}$ isoimeric derivatives, with the proviso that when R represents hydroxy the carbocyclic nucleus is a saturated cholane ring, and the nontoxic pharmacologically acceptable salts of the said acids with a nontoxic pharmaceutically accpetable carrier.

12. A method according to claim 11 wherein the active ingredient is 5β-cholanic acid, 5α-cholanic acid, $\Delta^3$-5β-cholenic acid, $\Delta^6$-5β-cholenic acid or $\Delta^7$-5β-cholenic acid.

13. A method according to claim 11 wherein the active ingredient is 5β-cholanic acid, $\Delta^3$-5β-cholenic acid or $\Delta^6$-5β-cholenic acid.

14. A method according to claim 11 wherein the active ingredient is present in the amount of from 5–15 mg./kg. of body weight.

15. A method according to claim 11 wherein the active ingredient is 5β-cholanic acid.

16. A method according to claim 11 wherein the active ingredient is $\Delta^3$-5β-cholenic acid.

17. A method according to claim 11 wherin the active ingredient is $\Delta^6$-5β-cholenic acid.

18. A method according to claim 1 wherein the active ingredient is present in the amount of from 5–15 mg./kg. of body weight of 5β-cholanic acid in tablet form.

References Cited

UNITED STATES PATENTS
2,180,095  11/1939  Strassberger et al. __ 260—397.1

OTHER REFERENCES
Portman et al.: Chem. Abst., vol. 57 (1962), p. 14267e.
Matkovics et al.: Chem. Abst., vol. 57 (1962), p. 5171f.
Veitsman et al.: Chem. Abst., vol. 66 (1967), p. 14038q.
Gottarelli et al.: Chem. Abst., vol. 67 (1967), p. 82302u.

SAM ROSEN, Primary Examiner